United States Patent [19]
Edwards

[11] 3,814,854
[45] June 4, 1974

[54] METHOD OF SYNCHRONIZING TELEVISION COMPATIBLE SIGNAL GENERATING EQUIPMENT TO COMPOSITE SYNCHRONIZATION SIGNALS

[75] Inventor: Philip K. Edwards, Washington Grove, Md.

[73] Assignee: Datavision, Inc., Rockville, Md.

[22] Filed: Oct. 4, 1971

[21] Appl. No.: 186,155

[52] U.S. Cl. .......................... 178/69.5 TV, 178/5.6
[51] Int. Cl. .......................................... H04n 5/04
[58] Field of Search .......... 178/5.6, 5.8 R, 69.5 TV, 178/69.5 G; 331/20, 21, 163

[56] References Cited

UNITED STATES PATENTS

| | | | |
|---|---|---|---|
| 2,752,424 | 6/1956 | Pugslem | 178/69.5 TV |
| 3,069,504 | 12/1962 | Kaneko | 179/15 BS |
| 3,187,261 | 6/1965 | Matsushima | 179/15 BS |
| 3,518,374 | 6/1970 | Askew | 178/69.5 TV |
| 3,532,806 | 10/1970 | Wilklund | 178/5.8 R |
| 3,562,415 | 2/1971 | Michels et al. | 178/5.6 |
| 3,567,861 | 3/1971 | Webb et al. | 178/69.5 TV |
| 3,639,838 | 2/1972 | Kuhn | 179/15 BS |

*Primary Examiner*—Richard Murray
*Attorney, Agent, or Firm*—Lane, Aitken, Dunner & Ziems

[57] ABSTRACT

To synchronize vertical and horizontal sync pulses produced by an auxiliary television generator, external reference sync pulses received via standard transmission are inverted and applied to the input of an AND gate along with the uninverted internally-generated sync pulses. The output of the AND gate is inverted and applied to start and stop a fixed-frequency oscillator providing the time base for internal sync pulse generation. The oscillator is turned off intermittently by the inverted AND gate output to delay the internal sync pulse signal sufficiently to correct for its overall phase difference relative to the reference sync pulse signal. Individual sync pulses are also delayed to correct for frequency mismatch so long as the internal sync signal frequency is from zero to 8 percent higher than the external signal frequency.

10 Claims, 6 Drawing Figures

INVENTOR
PHILIP K. EDWARDS

BY Lane, Aitken, Dunner & Ziems
ATTORNEYS

INVENTOR
PHILIP K. EDWARDS

BY Lane, Aitken, Dunner & Ziems
ATTORNEYS

INVENTOR
PHILIP K. EDWARDS

BY Lane, Aitken, Dunner & Ziems
ATTORNEYS

METHOD OF SYNCHRONIZING TELEVISION COMPATIBLE SIGNAL GENERATING EQUIPMENT TO COMPOSITE SYNCHRONIZATION SIGNALS

BACKGROUND OF THE INVENTION

The invention relates generally to the field of television, and more particularly to improved systems for synchronizing an independent, composite sync pulse generator with a reference sync pulse signal, broadcast, for example, by a standard TV transmitter.

TV images are formed by a technique known as raster scanning in which a spot of light of varying intensity is traced or swept over a repeating series of contiguous horizontal lines from top to bottom to cover the entire screen face. According to the current FCC standards, one "frame" comprises a pair of interlaced "fields" having a total of 525 horizontal lines from top to bottom. Whole frames are produced at the rate of 30 per second, sufficiently rapid to give the viewer the impression that the picture is continuous. Since it is necessary to synchronize the local receiver raster with the equipment originally used to generate the video images, sync pulses acting as sweep triggers are transmitted along with the video signal to control the horizontal scanning frequency and relative timing of the vertical flyback or transition from the bottom-most line to the top-most line in each field. Thus, while one is watching a particular channel on a conventional TV set, the transmitted signal is exercising remote control over the sweep cycle in the local receiver. The timing for different channels may be, and usually is, completely out of phase. That is, the sync pulse signal for one channel could not be used to correctly drive the sweep circuitry for another channel. This is usually of no consequence since only one channel is viewed at a time. But, if two independently generated images are to be displayed simultaneously, the horizontal (line) sync pulses as well as the vertical (field) sync pulses must be in complete agreement so that if one set of sync pulses is used to drive the receiver's sweep circuitry, the image associated with the other set of pulses will be correctly displayed.

SUMMARY OF THE INVENTION

The applicant has discovered that a sync pulse generator controlling an auxiliary video generator can be synchronized with a reference sync pulse signal, transmitted, for example, by a remote TV station, by passing the inverted reference signal to an AND gate along with the uninverted internal sync pulse signal. The output of the AND gate is inverted and used to start and stop a high-frequency oscillator which provides the time base for the internally-generated sync pulses. By turning the oscillator off at selected times, the internal sync signal is successively delayed until the horizontal and vertical sync pulses are in overall phase agreement with the external reference signal. A frequency difference between the two sets of sync pulses is accommodated by re-synchronizing each individual internal pulse by means of an appropriate delay interval controlled by the AND gate, provided that the internal sync signal frequency is from zero to 8 percent higher than the external sync signal frequency. Once the internal sync pulse signal is synchronized with the external signal for a particular TV channel, the auxiliary video signal can be applied directly to the TV receiver. The auxiliary video image will be displayed by the receiver as if it originated with the remote signal.

DESCRIPTION OF THE PREFERRED EMBODIMENT

Figure 1:
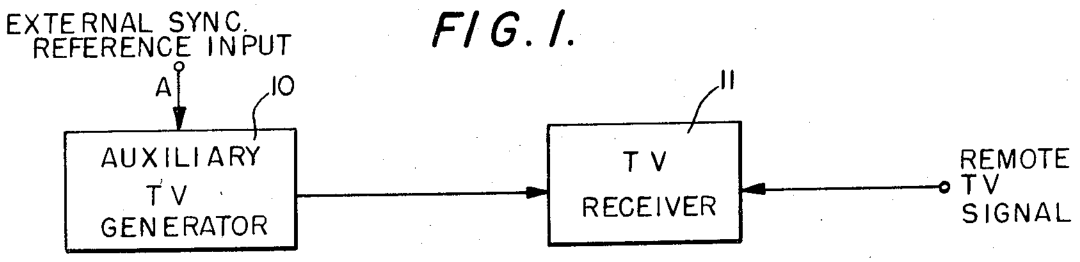
FIG. 1 is a block diagram illustrating a system for superimposing a synchronized auxiliary video signal on a remote TV signal.
Figure 2:
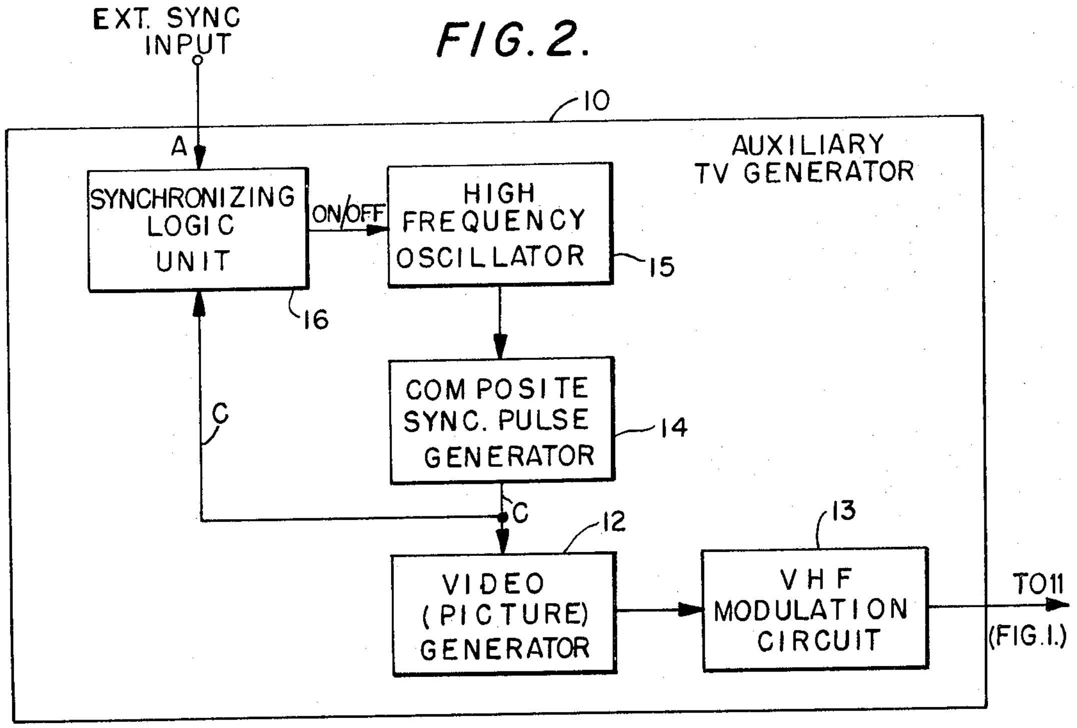
FIG. 2 is a block diagram of the auxiliary TV generator of FIG. 1.
Figure 3:
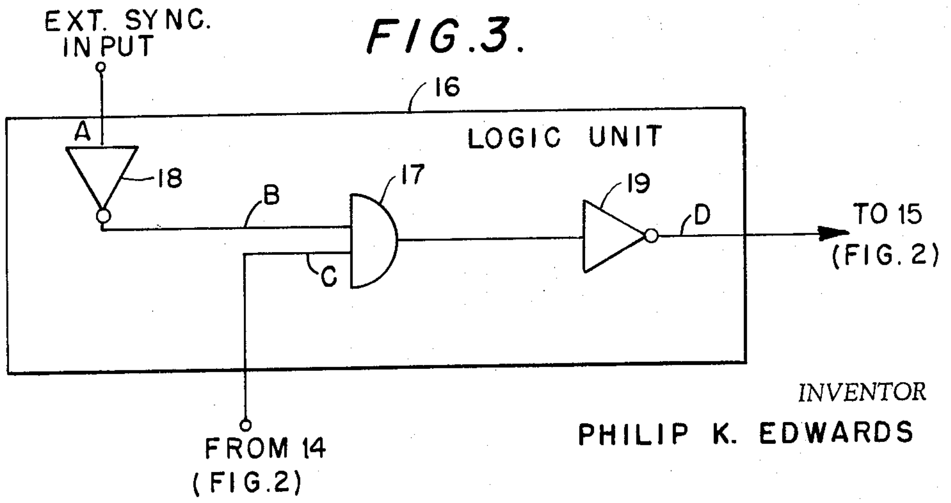
FIG. 3 is a block diagram of the synchronizing logic unit of FIG. 2.

Referring now to FIGS. 1, 2 and 3 of the drawings, an auxiliary TV generator 10 produces a video signal which is picked up by a TV receiver 11 and superimposed on a remote TV signal, for example, from a conventional TV station. The terms "auxiliary" and "remote" are used for convenience only to distinguish between the two independent signal sources; the relative location of the sources is unimportant. The auxiliary generator comprises a video generator 12 producing the picture signal indicative of the light intensity along each scanning line. Generator 12, for example, could be a TV camera, a video tape player, or a character generation unit for displaying words and numbers by means of precoded signals representing individual characters. A typical digital-type character generator is disclosed in U.S. Pat. No. 3,413,610. The video signal from generator 12 is impressed on a carrier wave by means of a conventional VHF modulation circuit 13 corresponding in frequency to a particular TV channel so that the auxiliary signal can be received by a standard receiver. The VHF modulator can be omitted if provision is made for entering the video signal into the internal circuitry of the TV receiver at the point where the output of the detector normally feeds the TV video amplifier.

Sync pulses in the standard format for controlling the timing of video generator 12 are provided by an internal sync pulse generator 14, having various well-known timing elements, driven by a high frequency master oscillator 15. The oscillator is typically a conventional low Q oscillator producing an output of from 15.75 kiloHertz to 50 megaHertz. The output of a synchronizing logic unit 16 is used to start and stop oscillator 15 to provide appropriate time delays in the output of internal sync generator 14 to synchronize video generator 12 with the external reference sync pulses in the remote TV signal. Logic unit 16 comprises a two input AND gate 17 having one input connected to receive the output of internal sync generator 14. The other AND gate input is the external or reference sync signal inverted by an inverter-amplifier 18. The external sync signal may be provided by a separate receiver for the remote TV signal or may be taken from the output of the appropriate detector circuit in the standard TV receiver. The output of AND gate 17 is passed to the control input of master oscillator 15 via an inverter 19 such that the oscillator runs with a logic one applied and stops with a logic zero. Inverter 19 should have low impedence in the logic zero state and high impedence in the logic one state. AND gate 17 and inverter 19 can be combined into the NAND function. Master oscillator 15 must drive the internal sync pulse generator at a frequency which produces an internal sync pulse train having a frequency equal to or up to 8 percent higher than the corresponding frequency of the external sync pulse train.

Figure 4:
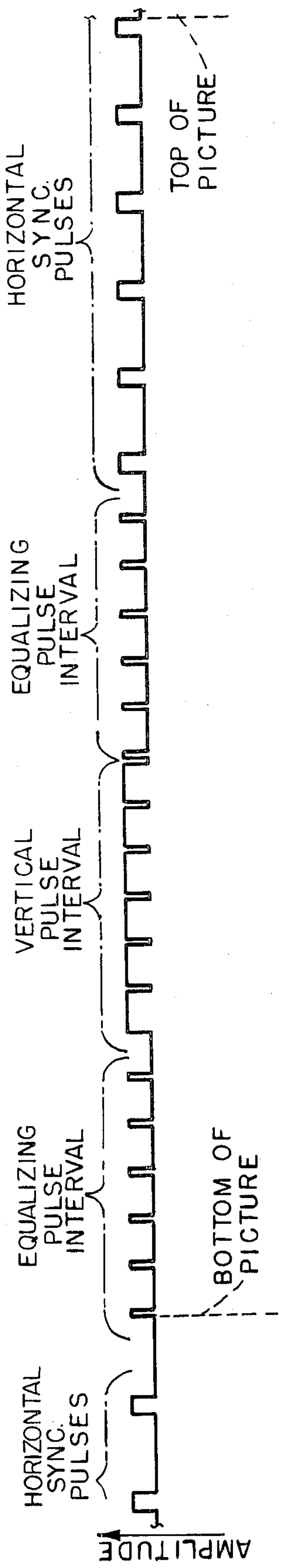
FIG. 4 is a wave-form diagram representing a standard TV sync pulse signal.

To explain the "control loop" effect of synchronizing logic unit 16 on internal sync pulse generator 14, it is important to understand the nature of the composite sync pulse train used for TV. FIG. 4 illustrates the format standardized by FCC regulations and adopted by the Electronics Industries Association. All domestic television signals, color as well as black and white, must adhere to this basic format and operate at specified frequencies. The signal for each field is really a composite made up of four distinct pulse intervals: horizontal sync, a first equalizing pulse interval, a vertical pulse interval, and a second equalizing pulse interval. The bulk of the composite sync pulse train is made up of horizontal or line sync pulses. At the end of each field, six vertical pulses of greater width than the horizontal pulses occur at twice the horizontal sync pulse frequency, indicating that the vertical deflection voltage should be blanked and returned to the proper value so that the next line will be scanned at the top of the next field. The vertical pulse interval is serrated to maintain the rhythm of the horizontal sync pulses during verticl blanking. Six equalizing pulses at double the horizontal sync pulse frequency are introduced ahead of the vertical pulse interval to prepare the horizontal sweep circuit for the serrated vertical impulses and six similar equalizing impulses are transmitted after the vertical pulse interval to prepare the horizontal sweep circuit for normal horizontal pulses agains. Since this particular sync pulse format has been in standard use in this country for more than two decades, a detailed discussion is omitted as it would be unnecessary for technically-trained individuals working in the television engineering arts.

Figure 5:
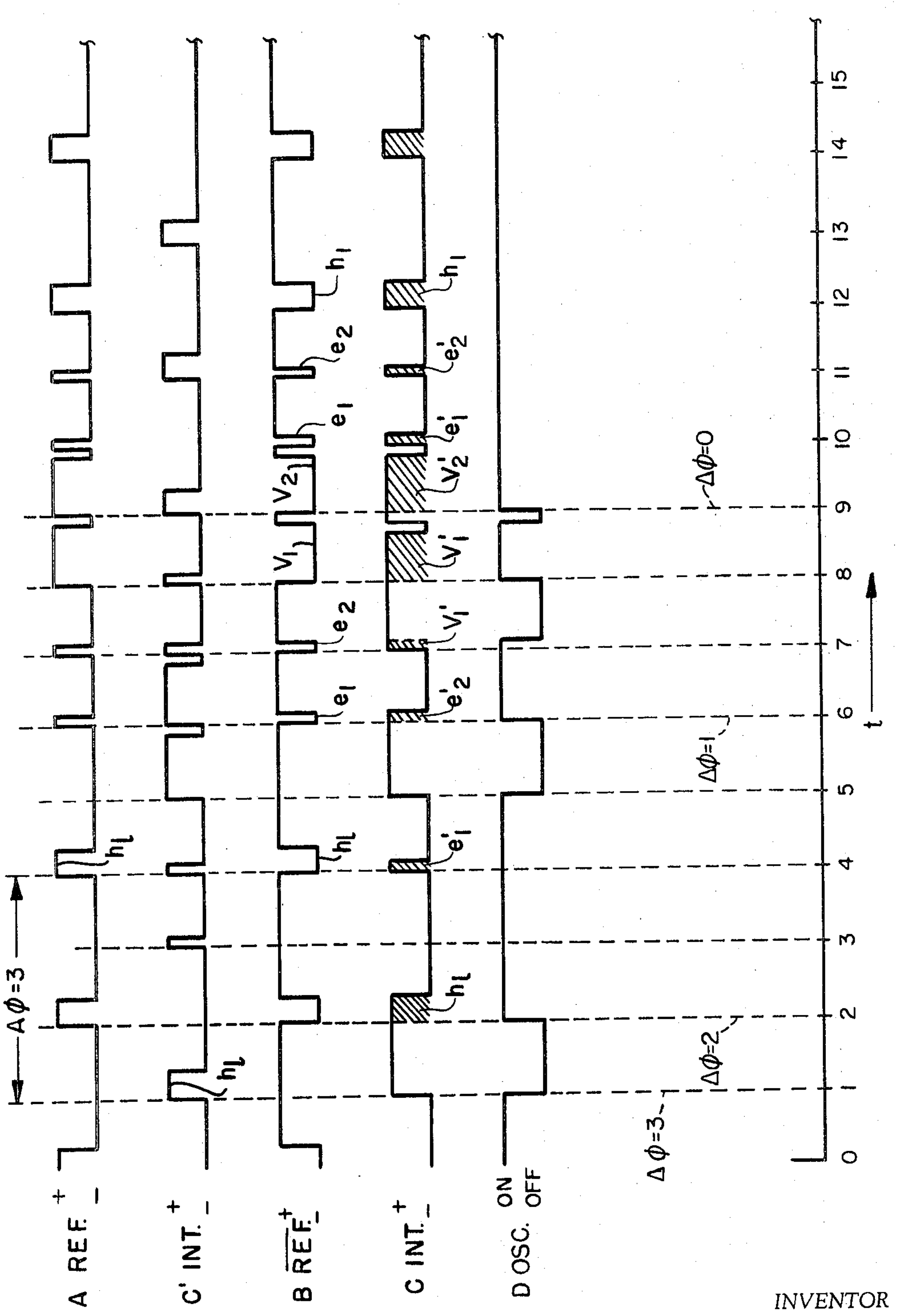
FIG. 5 is a timing diagram illustrating a typical sequence of wave-forms associated with the logic unit of FIG. 3.

Referring now to FIG. 5, the wave forms A, C′, B, C and D, corresponding to the lettered lines in FIG. 3, illustrate a typical synchronization sequence. Line A represents the external reference sync pulse signal. The number of equalization and vertical sync pulses have been reduced in each instance from six to two for convenience of illustration. Line C′ represents the internally generated sync pulse train which will be synchronized with line A by means of logic unit 16. In line C′ the internal sync pulse train is shown as it would appear if it were allowed to proceed without correction. Measured by the arbitrary time units at the bottom of the diagram, the phase difference between the pulse trains on lines A and C′ is three units, as illustrated for the leading edges of corresponding pulses $h_1$ and $h'_1$. In this example, the output of generator 14 (line C′) has a frequency approximately equal to that in line A. As will be seen, the synchronizing operation for minimizing phase difference is analagous when the internal pulse frequency is up to 8 percent higher than the external pulse frequency.

After inversion, the external sync pulses appear as shown in line B. Line C shows the actual closed loop effect of logic unit 16 on the internal sync pulses. As in line C′, the internal sync signal goes high at $t$=1, referring to the arbitrary time units. Since the inverted external signal in line B is also high at this time, the inverted output of AND gate 17 goes low, stopping oscillator 15, thereby discontinuing the generation of internal sync pulses. Since the oscillator was stopped at the very instant that line C went high, the signal on line C will now remain in the high state. At $t$=2, the inverted external signal in line B goes low, causing the output on line D to rise, thus unlocking the master oscillator so that the horizontal pulse $h'_1$ can be completed. Due to the stoppage of oscillator 15, the phase difference between lines A and C at $t$=2 is now only two time units instead of the initial three. The oscillator continues to run and at $t$=4, the internal sync signal is at the first equalizing pulse interval of its program sequence. Since the first equalizing pulse $e'_1$ has a width less than the inverted horizontal sync pulse $h_1$ in line B, there are no coincident high signals in lines B and C at this time. However, the equalizing pulse frequency is twice the horizontal sync pulse frequency. Therefore, the internal sync generator attempts to begin the next equalizing pulse $e'_2$ at $t$=5. This high signal in line C coincides with a high signal in line B, thus shutting down the master oscillator until, at $t$=6, the inverted external signal in line B goes low, allowing pulse $e'_2$ to be completed by the internal sync pulse generator. Due to the second stoppage of the master oscillator, the signals in lines A and C are now only one time unit apart at $t$=6. The next pulse attempted by the internal generator will be a vertical pulse $v'_1$ of longer duration, at $t$=7. The external sync signal at $t$=7 is just starting its second equalizing pulse $e_2$. Thus, the oscillator is not stopped until the end of inverted pulse $e_2$ in line B, at which time both lines B and C are in the high state.

At this point, it should be noted that part of the width of pulse $v'_1$ in line C has already been provided, thus at $t$=8 when inverted vertical pulse $v_1$ in line B begins and unlocks the oscillator, pulse $v'_1$ in line C still has to be completed. Pulse $v'_1$ in line C will terminate short of $t$=9 by a time interval equivalent to two consecutive equalizing pulses. Thus, the next vertical pulse in the internal signal will be begun before $t$=9 at a time equivalent to $t$=9 minus one equalizing pulse interval. Inverted vertical pulse $v_1$ in line B terminates simultaneously with the beginning of $v'_2$. Thus, as soon as the internal generator starts pulse $v'_2$, the oscillator is turned off for a short interval between pulses $v_1$ and $v_2$ in line B. At $t$=9, inverted pulse $v_2$ in line B begins, unlocking the oscillator and allowing pulse $v'_2$ to be completed in line C. At last, the two pulse trains in line A and line C are now in phase at $t$=9. Thus, the oscillator remains on and the signal on line D remains high from this point on.

The video signal produced by video generator 12 is correctly controlled by the internal sync pulse generator following synchronization. The auxiliary TV signal can now be superimposed on the remote signal on the screen of receiver 11. Although the internal and external sync pulses are synchronized after $t$=9 in FIG. 5, logic unit 16 continues to monitor their frequency and phase relationship so that if a phase difference recurs, it can be corrected automatically by starting and stopping oscillator 15.

As long as the frequency of the internal sync signal is equal to or up to 8 percent greater than the frequency of the external sync pulses, any phase difference between the two signals up to 360° can be corrected in a manner analagous to that in FIG. 5, where a small phase difference has been illustrated. For the worst possible case, the internal sync signal would have to be "backed up" almost one entire frame (two fields). It can be shown that the maximum time required for full synchronization of the vertical and horizontal sync pulses in the worst case is equal to:

Number of lines in full frame/Number of equalizing pulses × 1/frame frequency.

For the accepted FCC standard sync signals, this value would be computed as follows:

525/6 × 1/30 per second ≈ 3 seconds maximum.

This time interval is completely independent of the allowable frequency difference between the two signals.

Figure 6:
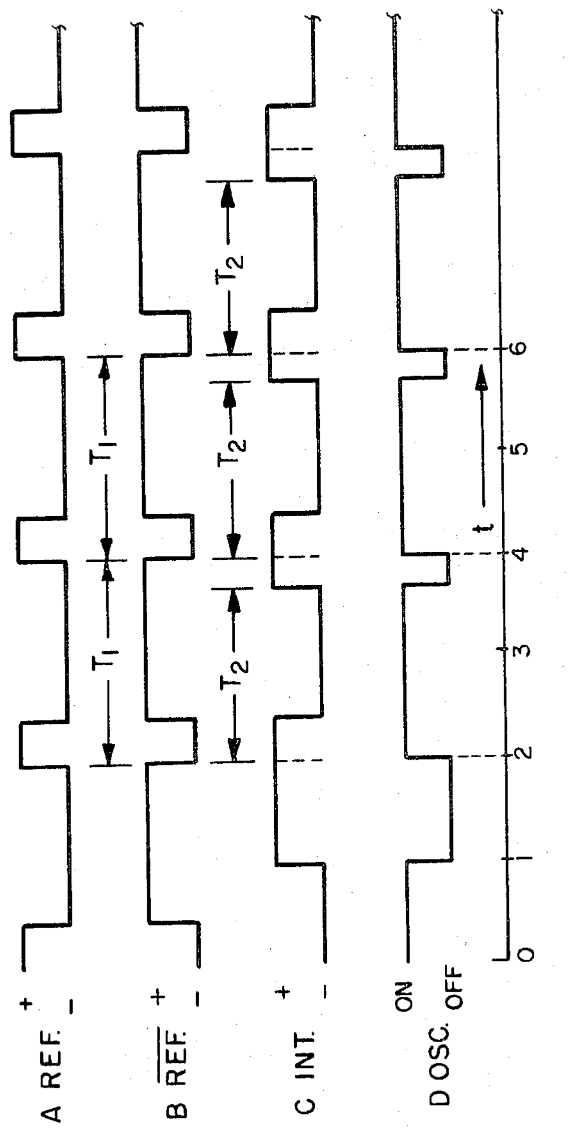
FIG. 6 is another timing diagram illustrating another typical sequence of wave-forms in the logic unit of FIG. 3 when the internal and external sync pulse signals differ in both frequency and phase.

Referring now to FIG. 6, a typical situation is depicted where the frequency $f_2$ of the internal sync pulses is slightly greater than the frequency $f_1$ of the external sync pulses. Thus, the period $T_1$ of the external signal ($f = 1/T$). Line A of FIG. 6 illustrates a sequence of horizontal sync pulses. Line B represents line A inverted by inverter 18 of FIG. 3. Line C is the closed loop internal sync signal which is initially out of phase by an amount equivalent to one arbitrary time unit. Thus when the signal in line C goes high at $t$=1, the inverted external signal is also high and the oscillator is halted by logic unit 16. At $t$=2, line B goes low, unlocking the oscillator, allowing the internal signal to complete its horizontal pulse. Because the period $T_2$ is less than $T_1$, the next horizontal pulse in line C occurs before $t$=4. Since line B is high at that time, the oscillator is turned off for an interval $T_1 - T_2$ or $(f_2 - f_1/f_1 f_2)$, until $t$=4, where line B goes low, unlocking the oscillator and allowing the horizontal pulse to be completed in line C. The same re-synchronization occurs with every horizontal pulse in the internal signal since the inherent period $T_2$ is not affected by turning the oscillator on and off. Thus the frequency of the internal signal is changed at each step, in effect, although the frequency of the master oscillator is unaltered. This is a very important advantage in that a variable frequency master oscillator is unnecessary.

It should be clear by now that the fixed frequency of oscillator 16 cannot vary too greatly from the frequency of the external sync pulses. It can be demonstrated that if the frequency of the internal sync signal is lower than the external signal or more than 8 percent higher than the external signa, phase synchronization is impossible. This frequency requirement is not a difficult one to meet, however, because of the rigid standardization of the transmitted external sync signal frequency. Assuming that the external sync signal varies negligibly, that is much less than ± 1 percent from the FCC standard, a reasonable choice for the master oscillator of the auxiliary TV generator would be one which produces a sync signal nominally 4 percent higher than the FCC standard. Thus, the master oscillator could be permitted to drift ± 4 percent without degrading the synchronization operation.

It should be understood that while one of the most direct applications of the synchronization system disclosed is for synchronizing two TV sync signals, the same system can be applied to synchronizing any two repeating logic signals containing the same sequence of pulses. Moreover, it is understood that various logic equivalents of the logic unit 16 can be used in place of the AND gate and two inverters shown in FIG. 3.

The compelling advantages of the invention lie in the direct and uncomplicated nature of the logic design. The auxiliary TV generator is simplified by allowing the use of a non-variable frequency oscillator.

It will be understood that various changes in the details, materials, steps and arrangements of parts which have been herein described and illustrated in order to explain the nature of the invention, may be made by those skilled in the art within the principle and scope of the invention as expressed in the appended claims.

What is claimed is:

1. A TV synchronizing system for directly superimposing an auxiliary TV picture on a standard TV picture, comprising means for receiving an external standard TV composite sync pulse signal in binary form, internal timing means for generating an internal TV sync pulse signal in binary form having a format identical to that of the external sync signal, independently fixed frequency oscillator means for producing a time-base output of independent frequency to said internal timing means such that said internal signal has an independently fixed nominal frequency higher than the corresponding nominal frequency of the external sync signal, logic means connected to said oscillator means for operatively receiving both the external and internal sync signals for producing a control output to stop said oscillator means on the occurrence of the predetermined coincidence of one state in said internal sync signal and the other state in the external sync signal and to start said oscillator means on the termination of said predetermined coincidence so as to alter pulsewidths within said internal sync signal to accommodate the frequency difference between said internal and external sync signals and to synchronize the phase of said external and internal signals, and video-generator means connected to said internal timing means for producing a picture output timed in accordance with said internal sync signal.

2. The system of claim 1, wherein said frequency of said internal sync signal is up to 8 percent higher than the corresponding frequency of said external sync signal.

3. The system of claim 2 further comprises high frequency modulation means for superimposing said picture output on a carrier frequency for standard television reception.

4. The system of claim 2 wherein said logic means includes inverter means connected to receive and invert the external sync signal, AND gate means operatively receiving the internal sync signal and the inverted external sync signal for producing an output indicative of said predetermined coincidence, said oscillator means being responsive to said AND gate means output for starting and stopping oscillation in accordance therewith.

5. The system of claim 4, wherein said logic means includes another inverter means connected between said oscillator means and said AND gate means output.

6. A system for synchronizing auxiliary signal-generating equipment with an external precoded composite binary pulse timing signal, comprising internal timing means for generating an internal binary pulse timing signal having a format identical to that of said external binary timing signal, independently fixed frequency oscillator means for producing a time-base output of independent frequency to said internal timing means such that said internal signal has an independently fixed nominal frequency higher than the corresponding nominal frequency of the external signal, logic means connected to said oscillator means and operatively receiving both said external and internal signals for producing a control output to stop said oscillator means on the occurrence of the predetermined coincidence of one state in said internal signal and the other state in said external signal and to start said oscillator means on the termination of said predetermined coincidence so as to alter pulsewidths within said internal signal to accommodate the frequency difference between said internal and external signals and to synchronize the phase of said internal and said external signals.

7. The system of claim 6, wherein said frequency of said internal timing signal is up to 8 percent higher than the corresponding frequency of the external timing signal.

8. The system of claim 7 further comprising information signal generating means connected to receive the internal timing signal and controlled thereby.

9. The system of claim 8 wherein said logic means includes inverter means connected to receive and invert the external timing signal, AND gate means operatively receiving the internal timing signal and the inverted external timing signal for producing an output indicative of said predetermined coincidence, said oscillator being responsive to the output of said AND gate means for starting and stopping oscillation in accordance therewith.

10. The system of claim 9, wherein said logic means includes another inverter means connected between said oscillator means and said AND gate means output.

* * * * *